(12) United States Patent
Baudin et al.

(10) Patent No.: US 6,343,716 B1
(45) Date of Patent: Feb. 5, 2002

(54) METERING END-FITTING AND CONTAINER FITTED WITH A METERING END-FITTING

(75) Inventors: Gilles Baudin, Domont; Philippe Bonningue, Paris, both of (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/420,501

(22) Filed: Oct. 19, 1999

(30) Foreign Application Priority Data

Oct. 23, 1998 (FR) ............................................ 98 13327

(51) Int. Cl.$^7$ .............................................. B65D 37/00
(52) U.S. Cl. ........................ 222/207; 222/212; 222/361
(58) Field of Search ................................ 222/107, 207, 222/212, 215, 378, 380, 383.1, 355, 361

(56) References Cited

U.S. PATENT DOCUMENTS

| | | | | |
|---|---|---|---|---|
| 2,464,030 A | * | 3/1949 | Engstrom ................ 222/380 X |
| 2,774,517 A | * | 12/1956 | Teegardin et al. ....... 222/380 X |
| 2,904,227 A | | 9/1959 | Graham ....................... 222/207 |
| 3,828,985 A | * | 8/1974 | Schindler .................... 222/207 |
| 4,875,603 A | * | 10/1989 | Weinstein ................ 222/207 X |
| 5,090,600 A | | 2/1992 | Clark ........................ 222/212 Y |
| 5,184,760 A | * | 2/1993 | Weinstein et al. .......... 222/207 |
| 5,253,788 A | * | 10/1993 | Vandromme et al. ... 222/207 X |
| 5,593,065 A | * | 1/1997 | Harrold ................... 222/207 X |
| 5,636,765 A | * | 6/1997 | DeJonge ................. 222/207 X |

FOREIGN PATENT DOCUMENTS

| | | |
|---|---|---|
| DE | 33 33 569 | 3/1985 |
| FR | 2 559 567 | 8/1985 |
| JP | 2-111643 | 9/1990 |
| JP | 10-072049 | 3/1998 |

* cited by examiner

Primary Examiner—Kenneth Bomberg
(74) Attorney, Agent, or Firm—Oblon, Spivak, McClelland, Maier & Neustadt, P.C.

(57) ABSTRACT

A metering end-fitting (1) has a metering chamber (30) inside which a piston (24) is slidably mounted, the piston being mounted so as to be able to pass from a first position in which the metering chamber (30) has a maximum volume to a second position in which the metering chamber (30) has a minimum volume. The metering chamber has at least one inlet passage (16, 17) which is open when the piston (24) is in the first position and substantially closed when the piston (24) is in the second position, the piston (24) being coupled to a closure element (50) which, in the first position of the piston (24) substantially closes off at least one outlet passage (15) in the metering chamber (30) and frees the outlet passage (15) when the inlet passage (16, 17) is closed. The closure element (50) moves with a shorter travel than the travel of the piston (24).

33 Claims, 4 Drawing Sheets

METERING END-FITTING AND CONTAINER FITTED WITH A METERING END-FITTING

BACKGROUND OF THE INVENTION

1. Field of the Invention

The present invention relates to a metering end-fitting for dispensing a fluid product in the form of doses of predetermined volume, especially a cosmetic product such as a shampoo, a conditioner, a gel, a lotion, a milk, etc. The invention also relates to a packaging and dispensing assembly fitted with a metering end-fitting according to the present invention.

2. Description of the Related Art

In the cosmetics field in particular, many hair products, particularly shampoos, are packaged in containers having deformable walls, the neck of which is closed off by a wall pierced at its center with one or more small holes for expelling the product. In order to dispense the product, the container is turned upside down and pressure is exerted on the deformable walls of the container to allow the product to be forced through the hole or holes. The product is collected in the palm of the user's hand and applied to his or her hair. However, this simple hand movement does not allow the amount of product dispensed to be metered.

Admittedly, there are devices for metering a product to be dispensed, but they are of such complexity that their cost is completely inappropriate to the economic requirements of certain distribution channels, particularly the mass market.

U.S. Pat. No. 5,090,600 describes a metering end-fitting of the type having a metering chamber formed inside a piston, a free end of which is provided with openings capable of allowing the metered expulsion of the product. The openings in the metering chamber are exposed by means of pressure exerted by the product on one face of the piston. The product then flows under gravity while the openings are exposed. When expelling the product, the closure element substantially emerges from the metering chamber. One of the problems associated with such a design stems from the fact that the element ensuring closure of the outlet holes in the metering chamber forms one piece with the piston. Consequently, the amplitude of the movement of the closure element is identical to the amplitude of the movement of the piston. Expulsion of a large dose of product requires a large-amplitude movement of the closure element, and so a bulky dispensing head with a closure element which, in the dispensing position, emerges considerably outside the metering chamber. Such a design is relatively detracting from an aesthetic standpoint, particularly when used for the packaging of cosmetic products. An alternative would consist in using a metering chamber having a larger cross section so that expulsion of the dose requires a shorter travel by the piston, and therefore by the closure element, but to drive the piston would require a high pressure which would be incompatible with the constraints relating to the use of cosmetic products.

Furthermore, although such an end-fitting is particularly appropriate for the metered dispensing of readily flowable liquid products such as drinks, it cannot be easily used for dispensing viscous liquid products, such as those commonly used in the cosmetics field. This is because the viscosity of these products does not permit the dose of product to flow sufficiently rapidly, merely under its own weight. Furthermore, the openings are formed from holes pierced in the wall of the metering chamber, and are therefore oriented radially with respect to the cross section of the metering chamber. Thus, at expulsion, the product leaves with an essentially radial component, which may be acceptable when the product flows solely under its own weight. On the other hand, such radial expulsion is completely unacceptable when the product leaves under pressure since it becomes difficult to gather the dispensed product in a localized manner.

U.S. Pat. No. 2,904,227 describes an end-fitting for metered dispensing of a product, which comprises a metering chamber inside which a piston is slidably mounted. Passing through the piston is an axial channel which terminates near the free end of the piston in a radial portion opening onto an outlet hole. In the rest position, the outlet hole is closed off. In order to dispense a dose of product, the outlet hole is exposed due to the pressure of the product being exerted on the piston. The product flows through a radial portion of the channel, passes into the axial part of the channel and leaves through the radial outlet hole. In the same way as for the device of U.S. Pat. No. 5,090,600, expulsion of the product is accompanied by a movement, outside the metering chamber, of a closure element integral with a piston, the amplitude of the movement depending on the dose to be dispensed.

Furthermore, in the same way as for the device of U.S. Pat. No. 5,090,600 the product leaves with a very large radial component, which does not allow localized dispensing of the product. In particular, in the case of a cosmetic product, it is difficult to collect the dispensed product in the palm of one's hand. Furthermore, the necessary passage of the product through the axial channel inside the piston makes the device particularly unsuitable for high flow rates, in particular for products having a high viscosity. In addition, such an axial channel is subject to fouling, in particular after a long period of non-use, which may make the device completely unusable.

SUMMARY OF THE INVENTION

One of the objects of the invention is to provide a metering end-fitting which completely or partly solves the aforementioned problems.

A further object of the invention to provide a metering end-fitting in which the movement of the closure element, closing off an outlet passage of the metering chamber, is not linked to the volume of the dose to be dispensed so that, even for doses of large volume, the movement of the closure element, especially outside the metering chamber, has a limited amplitude.

Yet a further object of the invention to provide a metering end-fitting which can be easily used and has a low manufacturing cost.

Another object of the invention to provide a metering end-fitting which is particularly suitable for the metered dispensing of products having a high viscosity.

Yet another object of the invention to provide a metering end-fitting which allows the metered and localized dispensing of a product under pressure.

According to the invention, these and other objects are achieved by a metering end-fitting intended to be mounted on a container containing a product, and comprising a metering chamber inside which a piston is slidably mounted, the piston being mounted so as to be able to pass from a first position in which the metering chamber has a maximum volume to a second position in which the metering chamber has a minimum volume. The metering chamber comprises at least one inlet passage which is open when the piston is in the first position and closed in a substantially sealed manner when the piston is in the second position, the piston being coupled to a closure element which, in the first position of the piston, closes off, in a substantially sealed manner, at least one outlet passage in the metering chamber and frees the outlet passage when the inlet passage is closed, the closure element moving with a shorter travel than the travel of the piston.

In practice, the closure element moves with a travel corresponding approximately to the axial height of the inlet passage, during which travel the closure element ensures that the outlet passage in the metering chamber is kept substantially closed as long as the inlet passages in the metering chamber are open. Next, once the or each outlet passage is exposed, the closure element is immobilized. From that moment on, only the piston moves inside the metering chamber so as to expel the dose that it contains. In other words, the closure element is integral with the piston only over a portion of the piston's travel. Thus the dispensing of doses of larger volume is permitted, while limiting that portion of the closure element which emerges out of the metering chamber when dispensing the dose. Thus, the aesthetic appearance and the practicality of the assembly produced are improved.

In a simplified manner, the piston defines, in combination with the closure element, a wall whose first face communicates with the container and whose second face (at least partly) communicates with the metering chamber. When dispensing the dose, the pressure of the product is first exerted on the wall portion corresponding to the closure element and continues until the inlet passages in the metering chamber are closed off. During this first phase, the closure element drives the piston towards the outlet passage in the metering chamber. Next, when the inlet passage in the metering chamber is closed and the outlet passages in the metering chamber are exposed, the closure element is immobilized. The pressure of the product is then exerted on the piston itself, which moves independently of the closure element until it reaches the second position.

Advantageously, the outlet passage and the closure element are arranged so that the product leaves the metering end-fitting in at least one stream with an essentially axial component. Typically the outlet passage is produced between the closure element and an opening formed in a wall of the metering chamber on the opposite side from the inlet passage. Thus, by modifying the number of passages and their size, it is possible to vary to a large extent the output flow rates of the product. In the case of a closure element in the form of a cylinder of revolution, it is possible to define for the product one or more flow passages which can extend over an angle that can vary from 1° to 360°. This flexibility permits the dispensing of products which have a viscosity chosen in the range going from very free flowing products to very viscous products, such as shampoos or gels.

In addition, with pressure being exerted under normal conditions of use, the product is expelled essentially along an axis, in this case the axis of the metering chamber. This essentially axial expulsion of the product makes it possible to collect it easily, especially in the palm of one's hand in the case of a shampoo. The manufacturing cost is compatible with the economic requirements of the mass market insofar as such an end-fitting consists of a limited number of parts whose production, especially by molding, does not involve the use of complicated and expensive molds. Typically, for a shampoo, the volume of the metering chamber is about 5 ml.

According to a preferred embodiment, a stop is provided in order to limit the travel of the closure element when the outlet passage is in the open position.

The stop may be located outside the metering chamber. Alternatively, the stop is provided on the closure element itself, and in this case inside the metering chamber.

According to a preferred embodiment, the metering chamber has a free end opposite the inlet passage, the outlet passage being set back with respect to the free end, the stop being arranged in such a way that, in the open position of the outlet passage, the closure element does not project substantially from the free end. Thus, the aesthetic appearance of the end-fitting, produced as one structure, is improved and the consumer does not see any apparent modification from the storage position to the dispensing position. Furthermore, with such a configuration, the outlet passage is located approximately at the bottom of a recessed portion formed by the metering chamber. This configuration helps to further improve the axial expulsion of the product which is guided inside the walls of the recessed portion. This advantage is particularly appreciable when the consumer exerts a large force on the walls of the bottle in order to expel the dose.

The walls of the recessed portion may furthermore guide that portion of the closure element which moves outside the metering chamber, ribs being advantageously provided for this purpose. These ribs furthermore define channels for conveying the product from the outlet passage towards the end of the metering chamber.

Advantageously, an external cover fits onto the metering end-fitting, the cover having at least one hole which is preferably located opposite the outlet passage, the stop consisting of a portion of the external cover. Apart from the stop function, the cover helps to improve the aesthetic appearance of the assembly. This external cover furthermore allows the characteristics, especially the dimensional characteristics, of the stream(s) of product dispensed to be varied.

Advantageously, an elastic return element is provided for returning the piston to the first position when the pressure of the product on the first surface of the piston is released. This return element, which is preferably a helical spring, facilitates the operation of the assembly. After a dose has been dispensed, no manipulation is needed for preparing the assembly for dispensing a new dose.

Alternatively, it is possible to provide for the return of the piston to take place manually by pressure exerted on the free end of the closure element, or when fitting a removable cap onto the metering end-fitting.

Preferably, an element is provided for driving the closure element into its position for closing off the outlet passage during the return of the piston to the first position, especially under the action of elastic return. By way of example, the driving element may consist of a stop provided on the closure element, and with which the piston is capable of coming into engagement.

Preferably, the container has deformable side walls, the pressure of the product on the first surface of the piston being obtained by exerting pressure on the walls. Air is allowed to enter the container when the pressure on the walls is released so as to compensate for the reduction in volume of product inside the container, after a dose of product has been dispensed. This configuration has the advantage of permitting a hand movement similar to the conventional hand movement used in the cosmetics field.

Preferably, the intake of air takes place, during the return of the piston to the first position, via the outlet passage in the metering chamber, before it is closed by the closure element. The construction of the assembly is thus facilitated by dispensing with a separate circuit for the air uptake.

According to a preferred embodiment, the inlet passage extends over an axial height such that, over a first part of the travel of the piston between the first and second positions, the inlet passage is open so as to allow substantially complete filling of the metering chamber, the closure element being arranged so that the outlet passage in the metering chamber is closed off when the piston moves over the first part of its travel. This makes it possible, in the case of a viscous product, to always be able to substantially fill the entire metering chamber, most particularly in the case of dispensing a viscous product, in a short time after a previous dispensing operation. This is because a highly viscous product, flowing under gravity, would be unable to have enough time to completely fill the metering chamber. With this advantageous characteristic of the invention, the gravity filling of the metering chamber is supplemented by pressurized filling, which takes place, as required, right at the start of a dispensing phase. More specifically, a plurality of such inlet holes are used, these being arranged in a uniform manner all around the periphery of the metering chamber.

According to a specific embodiment, the closure element has a first portion adjacent to the inlet passage and a second portion located on the opposite side from the inlet passage, the second portion having a larger cross section than the cross section of the first portion and extending over an axial height approximately equal to the axial height of the inlet passage so as to close off the outlet passage over the first part of the travel of the piston.

Preferably, the first and second portions are cylindrical in shape and separated from each other by a frustoconical portion. Thus, an annular outlet passage is defined when the opening made in the metering chamber lies opposite the frustoconical portion or of the cylindrical portion of smaller cross section. Such a geometry makes it possible for there to be a uniform stream of product all around the closure element, in the manner of a tube, the axial component of which is further enhanced, the frustoconical portion forming a ramp for the product so as to guide its flow in a substantially axial manner.

According to a preferred embodiment, the metering chamber is arranged annularly all around the closure element, the closure element being centered on the longitudinal axis of the metering chamber. Advantageously, the chamber and the closure element are of circular cross section. Although a circular cross section is preferred, any other cross section could be used, particularly a square, triangular, hexagonal, oval, star-shaped or other cross section. Likewise, the closure element may be provided so as not to be centered on the axis of the metering chamber.

The metering end-fitting according to the invention may be fixed, especially by bonding, snap-fastening or screwing, to a neck formed on the container. The fitting may also result from force-fitting inside the neck of the container. Preferably, the metering end-fitting according to the invention is obtained by molding a thermoplastic, especially one chosen from polypropylenes or polyethylenes.

According to another aspect of the invention, an assembly is also produced for the packaging and metered dispensing of a product, especially a cosmetic product, comprising a container formed from a body which has one end closed by a bottom, the other end forming a neck, a free edge of which defines an opening, a metering end-fitting according to the invention being fixedly mounted on the neck. The container may be in the form of a tube or a bottle. It may have any cross section, in particular an oval, elliptical or circular cross section. A cap may be provided for removably covering the metering end-fitting, especially in the storage position. Advantageously, the metering end-fitting is mounted along the axis of the container. However, this is not a necessary characteristic. In some cases, it may be desirable to mount the metering end-fitting at an angle with respect to the axis of the container so as to improve the degree of draining of the container.

Advantageously, the body has side walls capable of deforming when pressure is exerted on them and of returning to their initial shape when the pressure is released. Typically, the pressure is exerted in a direction perpendicular to the side walls.

Such an assembly is particularly suitable for the packaging and metered dispensing of a cosmetic product, especially a shampoo, a conditioner, a hair gel or a beauty milk or cream.

BRIEF DESCRIPTION OF THE DRAWINGS

The invention consists, apart from the arrangements explained above, of a number of other arrangements which will be explained below with regard to non-limiting embodiments described with reference to the appended Figures, in which.

DETAILED DESCRIPTION OF THE PREFERRED EMBODIMENT

Figure 2:
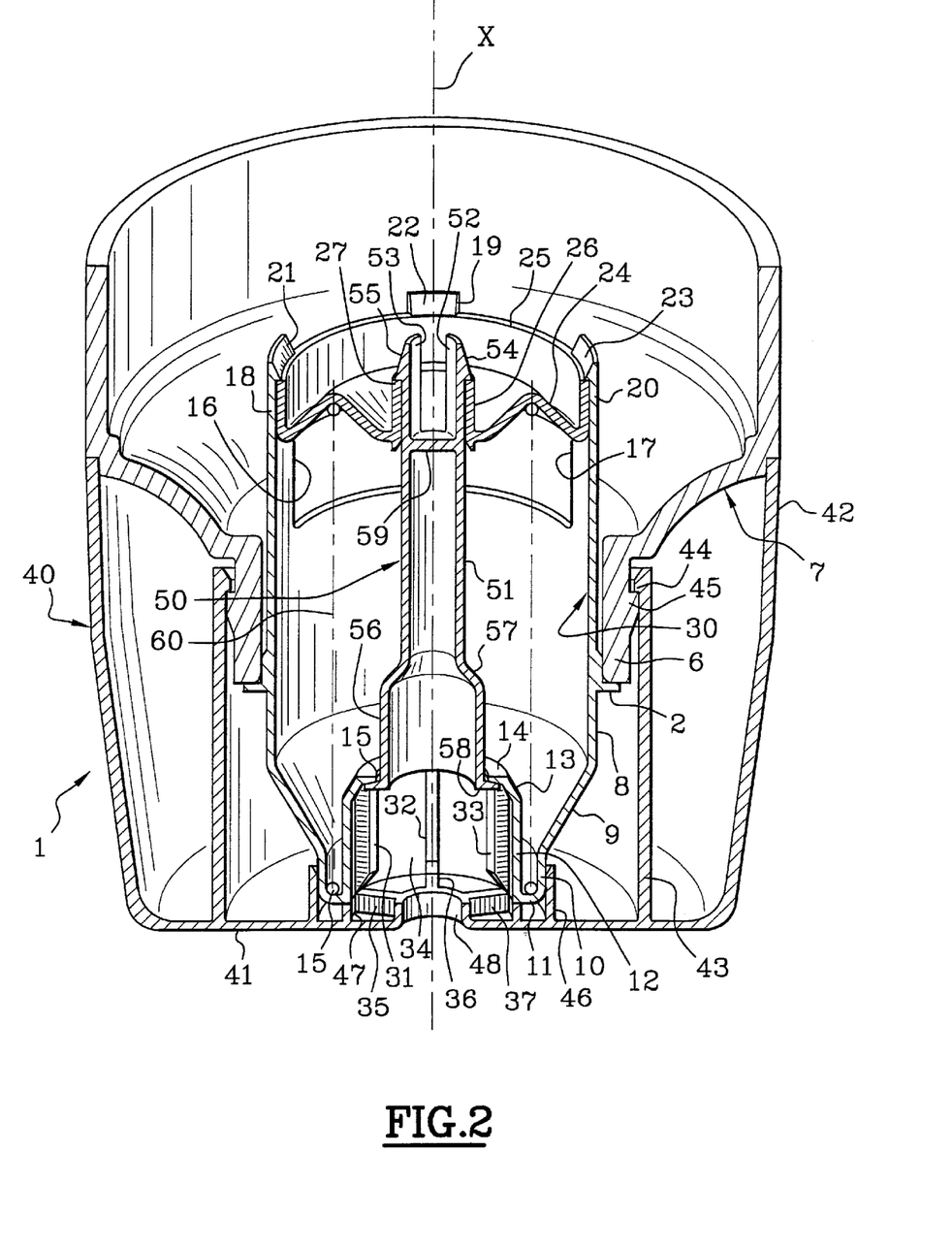
FIG. 2 shows an axial sectional view of an embodiment of the metering end-fitting according to the invention.

The end-fitting 1 shown in FIG. 2 (shown in the head-down position of the container) is force-fitted (or fitted by any other method) into the neck 6 of a container 7, especially a bottle having deformable walls. For this purpose, a collar 2 limits the penetration of the metering end-fitting into the neck 6.

The end-fitting 1 mainly comprises a metering chamber 30, the body of which is formed from a cylindrical skirt 8 of axis X and of circular cross section. One end of the skirt 8 located opposite the container 7 has a frustoconical portion 9. The frustoconical portion 9 is connected to a cylindrical end portion 10 of diameter less than the diameter of the skirt 8. The edge of the cylindrical end portion 10 which is opposite the frustoconical portion 9 is bent by 90° to form an annular collar 11 defining the free end of the metering chamber.

The edge of the annular collar 11 opposite the portion 10 is connected to a cylindrical skirt 12, a free edge of which extends toward the container 7. The cylindrical skirt 12 has a smaller diameter than the diameter of the cylindrical portion 10 and, together with the portion 10, forms an annular U-shaped groove. The free edge of the cylindrical skirt 12 has a frustoconical portion 13 terminating in a transverse rim 14 facing towards the axis X. The transverse rim 14 defines an opening 15 of circular cross section and centered on the axis X. The cylindrical skirt 12 thus defines, outside the metering chamber 30, a recessed portion 34 extending axially between the opening 15 and the annular end collar 11.

A cap 40 is placed over the metering chamber 30. The cap 40 has a transverse wall 41, the outer edge of which is connected to a lateral skirt 42 designed so that in the position with the cap fitted, the lateral skirt 42 is in alignment with the walls of the container 7. Also provided on the transverse wall 41 is a second skirt 43, concentric to the lateral skirt 41 and of smaller diameter. The second skirt 43 has a free edge, inside which is a snap-fastening bead 44 capable of engaging with a corresponding catch 45 formed on the external surface of the neck 6 of the container.

The transverse wall 41 also has a sealing skirt 46 concentric with the skirts 42 and 43, the internal diameter of which is slightly greater than the external diameter of the cylindrical skirt portion 10 of the metering chamber 30 so as to seal all around the cylindrical portion 10. The transverse wall 41 has another skirt 47, concentric with the skirts 42, 43 and 46, the diameter of which is such that, in the position with the cap 40 fitted, the skirt 47 is positioned in alignment with the cylindrical skirt 12 of the metering chamber 30. A hole 48 is made in the transverse wall 41, centered on the axis X and having a smaller diameter than the diameter of the opening 15.

The cylindrical skirt 12 has internal ribs 31, 32, 33 on its face which faces the recessed portion 34, the function of these ribs being, as will be seen in greater detail below, to guide the closure element 50 which will be described below. Furthermore, the ribs 31, 32, 33 define channels capable of conveying the product between the opening 15 in the metering chamber 30 and the hole 48 in the cap 40. Radial ribs 35, 36, 37 are provided on the internal face of the transverse wall 41 of the cap, between the skirt 47 and the hole 48, so as also to define passages for the product between the cap 40 and the closure element 50 when the latter is in the dispensing position, which will be described in greater detail below.

At its free end opposite the frustoconical portion 9, the skirt 8 has a number of indentations which, as will be seen in greater detail below, define with a corresponding edge 25 of a piston 24 a number of inlet passages 16, 17 for the product, in this case four, these being arranged uniformly over the entire circumference of the skirt 8. The inlet passages are separated by catching and guiding tabs 18, 19, 20 which have a degree of radial elasticity with respect to the skirt 8. The free ends of the catching and guiding tabs terminate in flanges 21, 22, 23 facing towards the inside of the skirt. The flanges 21, 22, 23 are intended, as will be seen in greater detail below, for keeping the piston 24 inside the metering chamber 30.

In practice, only the guiding function is necessary. This is because the piston 24 is kept inside the metering chamber by virtue of it being coupled to the closure element 50, the movement of which inside the metering chamber and towards the bottom of the container, is limited by the presence of a stop 58 which be referred to in greater detail below. The coupling of the piston to the closure element 50 will also be described in greater detail below. In this particular situation, the flanges 21, 22, 23 are not necessary.

The piston 24 is slidably mounted inside the skirt 8, an external edge 25 of this piston being bent over towards the bottom of the container 7 so as to "slide" in a more or less sealed manner along the walls of the metering chamber 30. The gap existing between the edge 25 and the walls of the metering chamber depends on the viscosity of the product and on the desired degree of comfort when dispensing the product. The gap will be greater, the higher the viscosity. An internal edge of the piston is bent over towards the bottom of the container 7 so as to form an axial bushing 26 having a free edge 27 oriented towards the bottom of the container 7. Between the external edge 25 and the axial bushing 26, the piston has a V-shaped profile, the apex of which faces the bottom of the container. The closure element 50 is slidably mounted inside the axial bushing 26. The closure element 50 has a first portion 51 of slightly smaller cross section than the cross section of the axial bushing 26 so that it is able to slide in a substantially sealed manner inside the axial bushing.

The portion 51 is closed in its upper part by a transverse wall 59. The transverse wall 59 is surmounted by a number of elastically deformable catching tabs 52, 53, the external surface of which have catches 54, 55 capable of forming a stop for the free edge 27 of the axial bushing 26 of the piston so as to prevent the piston from separating from the closure element 50. The piston is mounted on the closure element 50 by elastically deforming the catching tabs 52, 53 until the catches 54, 55 are clear of the axial bushing 26. After the catches have become clear of the axial bushing, the catching tabs 52, 53 return by springing back to the rest position in which they form a stop for the piston. The portion 51 extends over about two-thirds of the height of the closure element 50.

On the opposite side from the catching tabs 52, 53, the closure element 50 has a portion 56 of greater diameter than the diameter of the portion 51. The portion 56 is separated from the portion 51 by a frustoconical portion 57. The portion 56 has a slightly smaller external diameter than the internal diameter of the opening 15 so as to slide in a substantially sealed manner inside the opening 15. The lower end of the portion 56 of the closure element 50 terminates in a rim 58 of greater external diameter than the diameter of the opening 15, which rim is located outside the metering chamber 30, and inside the recess portion 34. The external diameter of the rim 58 is slightly less than the internal diameter of the ribs 31, 32, 33 so that the latter provide good translational guiding of the closure element.

The maximum height of the inlet holes or passages 16, 17 corresponds approximately to the height (under the flanges 21, 22, 23) of the catching tabs 18, 19, 20 less the height of the external edge 25 of the piston 24. Typically, this maximum height is of the order of a few millimeters. By way of example, the inlet passages have an axial height which is of the order of 10 mm. The height of the portion 56 of the closure element corresponds approximately to the maximum height of the inlet passages 16, 17, so that the outlet passage 15 opens approximately at the same time as the inlet passages close. The rim 58 of the closure element is intended, in the dispensing position, to butt against the ribs 35, 36, 37 formed on the internal face of the transverse wall 41 of the cap. In this position, the opening 15 is opposite the frustoconical portion 57 (or opposite the cylindrical portion 51) of the closure element 50 so as to form an annular passage 15 (see FIGS. 3B, 3C), for expulsion of the product, between the transverse rim 14 and the closure element 50. Such an annular passage can have a radial width of the order of a few mm.

A helical spring 60, one end of which butts against the piston 24, approximately at the apex of the V formed by the piston, and the other end of which is in abutment in the bottom of the U-shaped annular groove formed at the free end of the metering chamber 30, forces, in the rest position, the edge 25 of the piston to bear against the catching flanges 21, 22, 23 of the metering chamber 30 so that, in the absence of sufficient pressure exerted on the walls of the container 7, the inlet passages 16, 17 in the metering chamber 30 have a maximum opening. In this position illustrated in FIG. 2, the rim 58 of the closure element 50 is forced to bear on the rim 14 defining the opening 15 so as to close off the latter in a sealed manner.

Thus, the piston can move axially between:

a) a height position in which the rim 25 of the piston bears against the catches 21, 22, 23 of the catching tabs 18, 19, 20. In this position, the inlet passages 16, 17 in the metering chamber are open to the maximum extent. The closure element 50 is also forced into the high position in which the rim 58 sealingly closes off the opening 15 in the metering chamber 30; and b) a low position in which the piston 24 bears against the rim 14 defining the opening 15 and/or bears via its periphery against the frustoconical portion 9 of the metering chamber. In this position, the metering chamber 30 has a minimum volume and is substantially (that is to say to within the clearances) isolated by the piston 24 from the contents of the container 7. The closure element 50 is then in abutment against the ribs 35, 36 and 37. The frustoconical portion 57 of the closure element 50 is opposite the rim 14 of the metering chamber. The piston 24 may have a profile such that, in this minimum-volume position of the metering chamber, the piston closes off the opening 15 in the metering chamber. Between these two positions, the outlet passage 15 in the metering chamber is exposed. The inlet passages 16, 17 do not communicate with the metering chamber. The piston 24, under the pressure of the product, expels the contents of the dose through the outlet passage 15 (see FIGS. 3B, 3C).

It should be noted that one of the parameters on which the volume of the dispensed dose depends is the axial travel of the piston. This travel, and therefore consequently the volume of the dose dispensed, may be modified in a simple manner merely by changing the axial profile of the piston 24. This solution is markedly simpler to implement than that of modifying the diameter of the piston, since a single piece, in this case the piston, need only be modified.

Figure 1A:
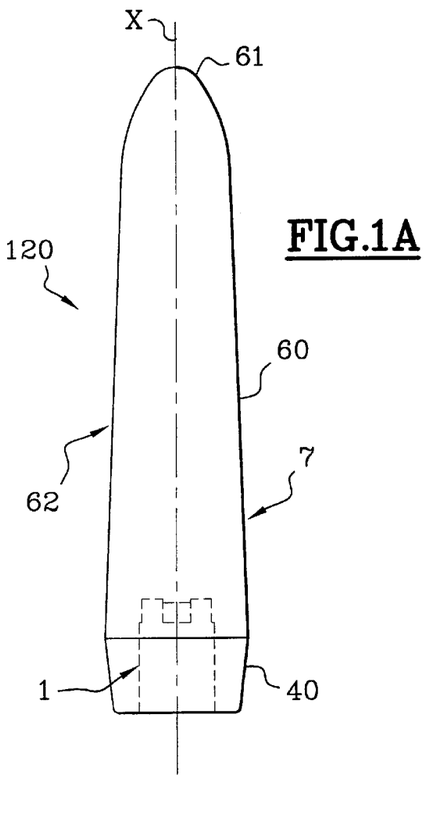
FIG. 1A illustrates a container fitted with a metering end-fitting according to the present invention, in the rest position.
Figure 1B:
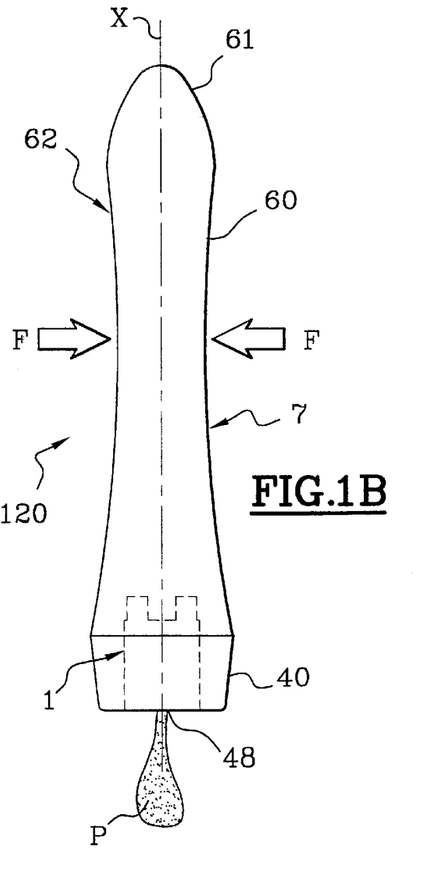
FIG. 1B illustrates a container fitted with a metering end-fitting according to the present invention, in the dispensing position.

As shown in FIGS. 1A and 1B, the assembly 120 on which the metering end-fitting 1 according to the invention is mounted consists of a bottle 7, for example one made of polyethylene or polypropylene. The bottle 7 has a body 62 closed by a bottom 61. The body is of elongate cross section and formed from two large faces 60, which are "elastically" deformable under the effect of pressure F exerted, as illustrated in FIG. 1B, in a direction perpendicular to the large sides of the bottle. In the dispensing position illustrated in FIG. 1B, in response to pressure F exerted on the walls of the bottle, in a direction perpendicular to its large faces, the product P is dispensed in an essentially axial stream through the hole 48 made in the cap 40. During dispensing, no part of the metering end-fitting 1, and in particular the closure element, emerges appreciably from the external cover 40.

FIGS. 1A–1B and 3A–3D, to which reference will now be made, illustrate the operation of the metering end-fitting described with reference to FIG. 2. In the rest position (as described with reference to FIG. 2), the container 7 is preferably placed head down on a flat surface. In this position, the outlet passage 15 in the metering chamber 30 is closed off by the rim 58 of the closure element. The piston 24, urged by the spring 60, is in abutment against the flanges 21, 22, 23 of the catching tabs 18, 19, 20. The inlet holes 16, 17 are exposed so that the product can flow under gravity into the metering chamber 30, all around the closure element 50, so as to fill the metering chamber 30. This rest position is also shown in FIG. 1A.

Figure 3A:
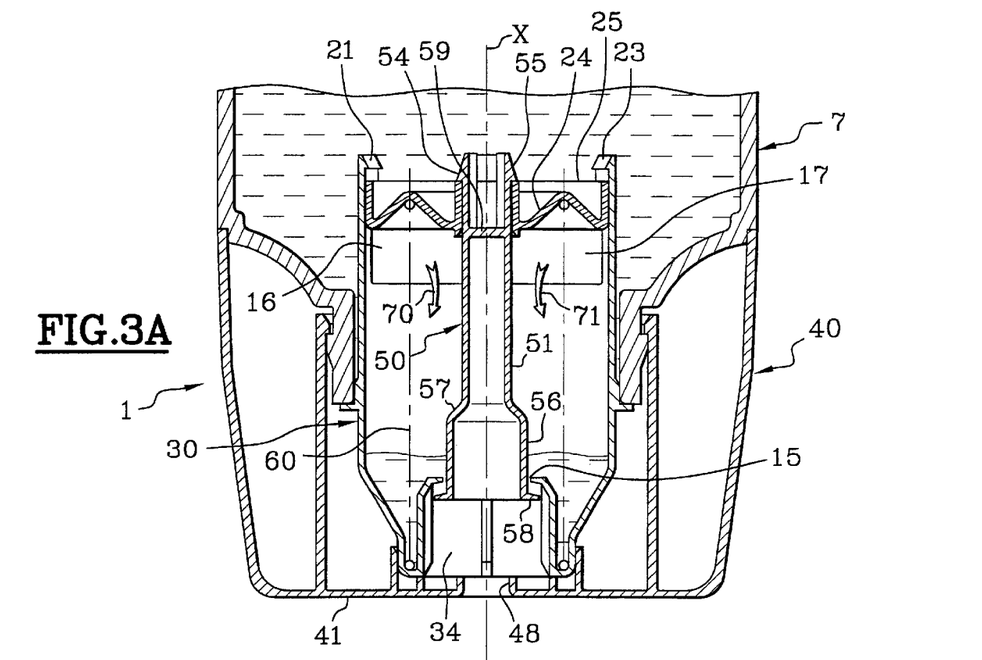
FIGS. 3A–3D illustrate the various steps in the operation of the dispensing end-fitting of FIG. 2.
Figure 3B:
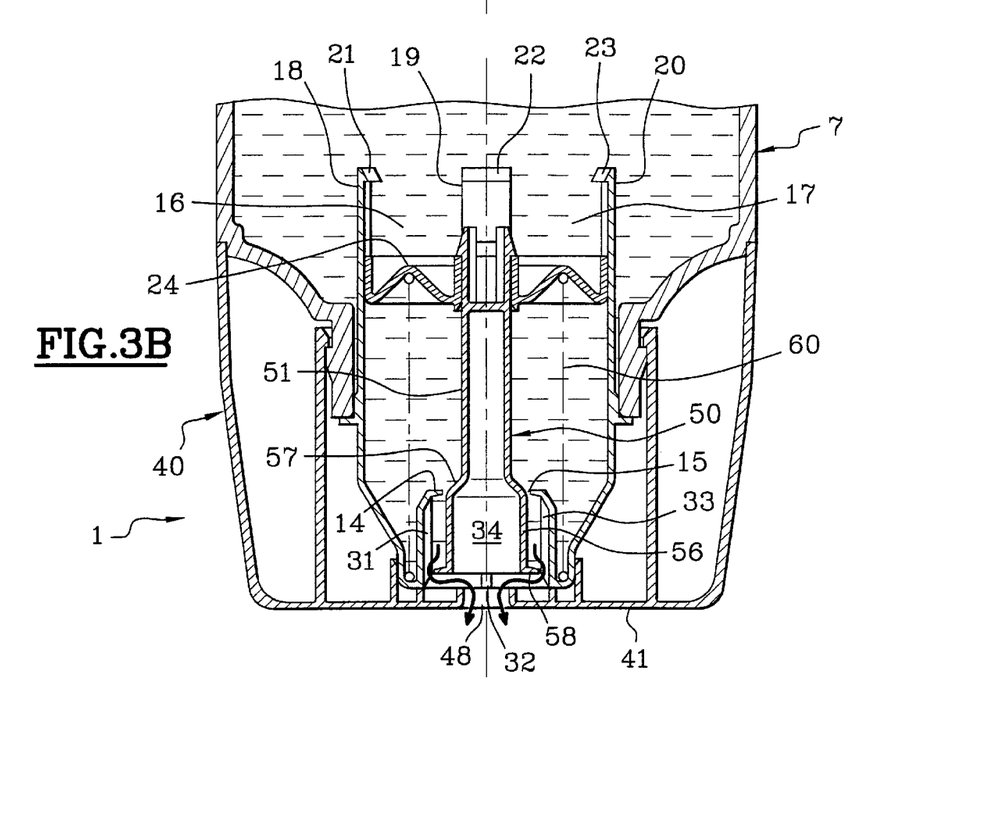

In FIG. 3A, pressure is exerted on the side walls of the container while holding the container 7 head down, in one's hand. If the product has not had time to fill the entire metering chamber by gravity (for example between two closely separated dispensing operations in the case of a highly viscous product), the product is first forced towards the openings 16 and 17 in the metering chamber until the latter is completely filled. The incoming streams of the product are represented by the arrows 70 and 71. In this "communicating" position of the openings 16, 17, the forces which are exerted on each of the faces of the piston 24 are in equilibrium, the piston advancing towards the outlet passage 15 in the metering chamber 30 only under the effect of the pressure of product exerted on the transverse wall 59 of the closure element 50. During this first part of the movement of the piston 24, the outlet passage 15 is closed off in a substantially sealed manner by the portion 56 of the closure element 50. The allowed clearances for maintaining the necessary sealing can vary depending on the viscosity of the product. In practice, the clearances are adjusted so as to have the best compromise between sealing and comfort when dispensing.

After a travel approximately equal to the axial height of the openings 16, 17, (FIG. 3B), the piston 24 breaks the communication between the metering chamber 30 and the container 7, the indentations defining the openings 16 and 17 then being on that side of the piston 24 which is opposite the metering chamber 30. At substantially the same moment, the frustoconical portion 57 and possibly the start of the cylindrical portion 51 of the closure element are opposite the rim 14, thereby freeing the annular outlet passage 15 in the metering chamber 30. The product then flows out through the outlet passage 15, emerges in the channels defined by the ribs 31, 32, 33, then passes under the rim 58 of the closure element 50 via the channels defined by the ribs 35, 36, 37 and, finally, is dispensed via the hole 48 in the external cover 40. Simultaneously with the outlet passage 15 opening, or even slightly afterwards, the closure element 50 comes into the position of abutment against the ribs 35, 36, 37 formed on the internal face of the cap 40.

Figure 3C:
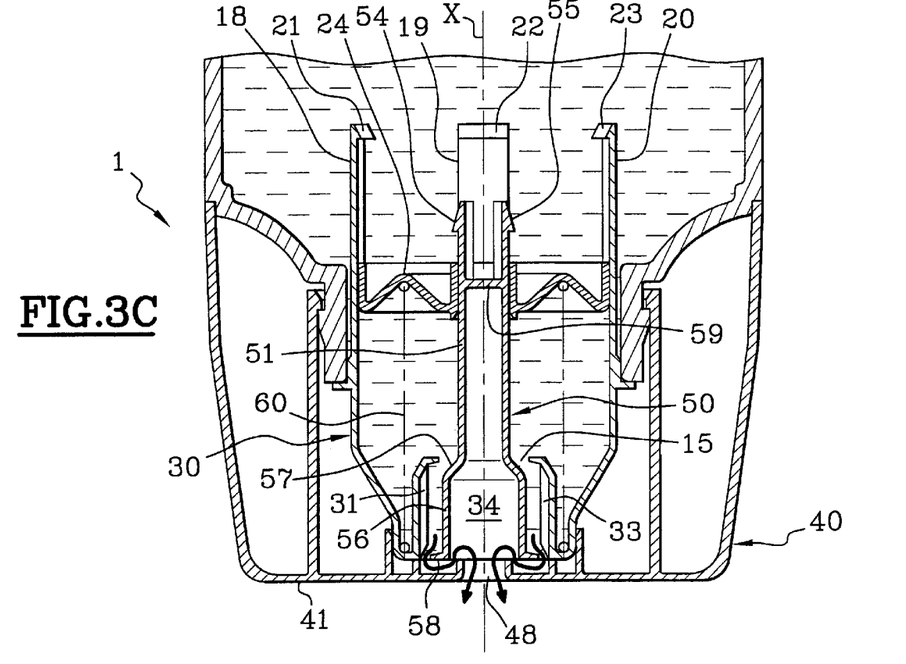

Next, and as shown in FIG. 3C, the piston 24 continues its progress towards the outlet passage 15 in the metering chamber 30 under the pressure of the product exerted on its face communicating with the container, the closure element 50 still being in abutment against the ribs 35, 36, 37 of the cap 40. The contents of the metering chamber 30 then empty through the outlet passage 15 and the hole 48. Thus, as shown in FIG. 3C, the product is dispensed in a substantially axial stream. The product leaves in a localized manner approximately along the axis of the container, and can be collected in the palm of the user's hand.

Figure 3D:
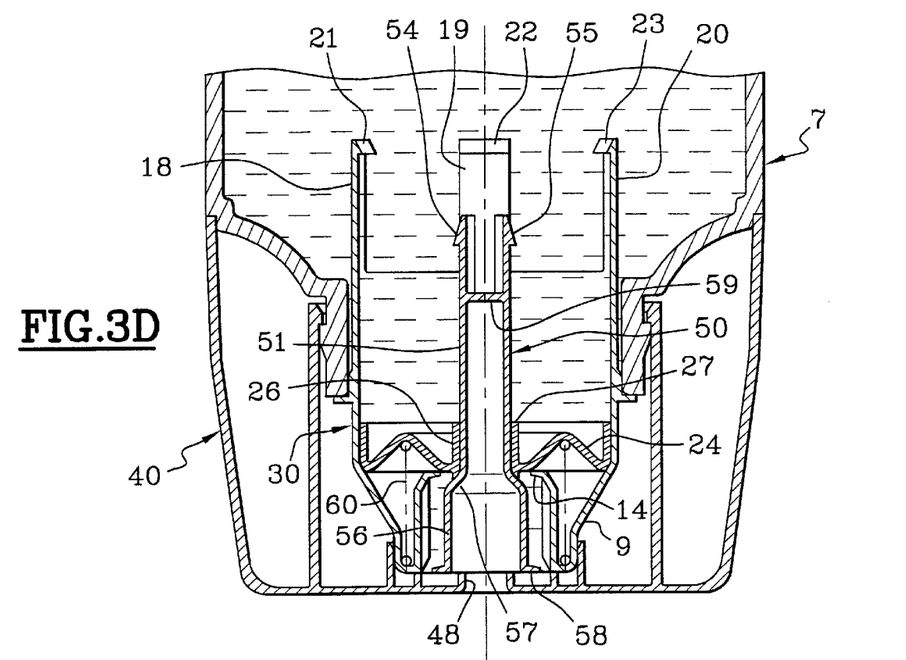

In FIG. 3D, the piston is in abutment against the rim 14 of the metering chamber and/or, around its periphery, against the frustoconical portion 9 of the metering chamber 30, which chamber then has a minimum volume. The spring 60 is greatly compressed. However, and preferably, the turns are not completely touching in this position, so as not to create a barrier for the product. At this moment, the dispensing operation is interrupted.

By releasing the pressure exerted on the walls 60 of the bottle, these walls resume their initial position. The piston 24, under the action of the return force of the spring 60, goes back into the high position of abutment against the flanges 21, 22, 23 of the tabs 18, 19, 20. Upon its return into this position, the free edge 27 of the axial bushing 26 of the piston engages with the catches 54, 55 of the closure element 50, therefore driving the latter into the high position until it closes off the outlet passage 15 in the metering chamber. During this return to the high position, air is drawn into the container 7 via the outlet passage 15, before it closes, so as to compensate for the loss of volume inside the container brought about by the dispensing of a dose of product. It should be noted that the uptake of air firstly takes place by being drawn in via the outlet passage 15 during the rise of the piston due to the elastic return forces of the spring 60. The air thus drawn in is then conveyed into the container 7 via the openings 16, 17, when communication is reestablished between the metering chamber 30 and the container 7.

In the detailed description above, reference was made to preferred embodiments of the invention. Of course variants may be made thereto without departing from the scope of the invention as claimed below.

What is claimed is:

1. A metering end-fitting to be mounted on a container containing a product, said end-fitting comprising:
   a metering chamber having at least one outlet passage, said metering chamber further including a skirt and at least one inlet passage extending through said skirt;
   a piston defining a portion of the metering chamber and slidably mounted in said skirt so as to be able to pass from a first position in which the metering chamber has a maximum volume to a second position in which the metering chamber has a minimum volume, and wherein said at least one inlet passage is at least partially disposed between said piston and said at least one outlet passage when said piston is in the first position such that said at least one inlet passage is open when the piston is in the first position, and wherein said piston is at least partially disposed between said at least one inlet passage and said outlet passage when said piston has reached the second position such that said at least one inlet passage is closed in a substantially sealed manner when the piston has reached the second position;
   a closure element coupled to the piston such that, in the first position of the piston, the closure element closes off in a substantially sealed manner the at least one outlet passage in the metering chamber, said closure element being mounted to move with a shorter travel than the travel of the piston.

2. The metering end-fitting according to claim 1, wherein said outlet passage and the closure element are arranged so that the product leaves the metering end-fitting in at least one stream having an essentially axial component.

3. The metering end-fitting according to claim 1, further comprising at least one stop element positioned to limit the travel of the closure element when the outlet passage is in the open position.

4. The metering end-fitting according to claim 3, wherein the stop element is located outside the metering chamber.

5. The metering end-fitting according to claim 3, further comprising an external cover having at least one hole opposite said outlet passage, said stop element comprising a portion of said external cover.

6. The metering end-fitting according to claim 3, wherein when the closure element is in abutment with the stop element, the piston is capable of sliding with respect to the closure element until the piston is in the second position.

7. The metering end-fitting according to claim 3, wherein the metering chamber has an end opposite the inlet passage, said outlet passage being offset with respect to said end, and said stop element being arranged such that in the open position of the outlet passage, said closure element does not project substantially from said end.

8. The metering end-fitting according to claim 1, wherein the closure element is coupled to said piston such that said closure element is moved to a position for closing the outlet passage during the return of the piston to the first position.

9. The metering end-fitting according to claim 1, further comprising means for allowing air to be taken up into the container during the return of the piston to the first position.

10. The metering end-fitting according to claim 1, wherein the inlet passage extends over an axial height such that, over a first part of the travel of the piston between said first and second positions, the inlet passage is open so as to allow substantially complete filling of said metering chamber, said closure element being arranged so that the outlet passage in the metering chamber is closed when the piston moves past said first part of its travel.

11. The metering end-fitting according to claim 1, wherein said skirt includes at least one tab to prevent said piston from moving out of said metering chamber, and wherein said piston is adjacent to said at least one tab when said piston is in the first position.

12. The metering end-fitting according to claim 1, wherein said closure element frees said outlet passage substantially at a time that the inlet passage closes.

13. A metering end-fitting to be mounted on a container containing a product, said end-fitting comprising:
   a metering chamber having at least one outlet passage;
   a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;
   a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, further comprising at least one stop element positioned to limit the travel of the closure element when the outlet passage is in the open position, wherein the metering chamber has an end opposite the inlet passage, said outlet passage being offset with respect to said end, and said stop element being arranged such that in the open position of the outlet passage, said closure element does not project substantially from said end, wherein the outlet passage is located approximately at a recessed portion formed by said metering chamber.

14. The metering end-fitting according to claim 13, wherein said recessed portion includes a guiding portion of the closure element which moves outside the metering chamber.

15. The metering end-fitting according to claim 14, wherein said guiding portion includes a plurality of ribs made on a wall of said recessed portion, said ribs further defining a number of channels capable of guiding the product from the outlet passage towards an outlet hole in the metering end-fitting.

16. A metering end-fitting to be mounted on a container containing a product, said end-fitting comprising:
   a metering chamber having at least one outlet passage;
   a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston such that, in the first position of the piston, the closure element closes off in a substantially sealed manner the at least one outlet passage in the metering chamber, and such that the closure element frees said outlet passage substantially at a time that the inlet passage closes, said closure element being mounted to move with a shorter travel than the travel of the piston;

the metering end-fitting further comprising an elastic return element positioned to return the piston to said first position when a pressure of the product on the piston is released.

17. A metering end-fitting to be mounted on a container containing a product, said end-fitting comprising:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, wherein the inlet passage extends over an axial height such that, over a first part of the travel of the piston between said first and second positions, the inlet passage is open so as to allow substantially complete filling of said metering chamber, said closure element being arranged so that the outlet passage in the metering chamber is closed when the piston moves past said first part of its travel, wherein the closure element moves with the piston over said first part of the travel of the piston.

18. A metering end-fitting to be mounted on a container containing a product, said end-fitting comprising:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, wherein the inlet passage extends over an axial height such that, over a first part of the travel of the piston between said first and second positions, the inlet passage is open so as to allow substantially complete filling of said metering chamber, said closure element being arranged so that the outlet passage in the metering chamber is closed when the piston moves past said first part of its travel, wherein said closure element has a first portion adjacent to the inlet passage and a second portion located opposite the inlet passage, said second portion having a larger cross section than the cross section of the first portion and extending over an axial height approximately equal to the axial height of the inlet passage so as to substantially close off the outlet passage over said first part of the travel of the piston.

19. A metering end-fitting to be mounted on a container containing a product, said end-fitting comprising:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, wherein the inlet passage extends over an axial height such that, over a first part of the travel of the piston between said first and second positions, the inlet passage is open so as to allow substantially complete filling of said metering chamber, said closure element being arranged so that the outlet passage in the metering chamber is closed when the piston moves past said first part of its travel, wherein said closure element has a first portion adjacent to the inlet passage and a second portion located opposite the inlet passage, said second portion having a larger cross section than the cross section of the first portion and extending over an axial height approximately equal to the axial height of the inlet passage so as to substantially close off the outlet passage over said first part of the travel of the piston, and wherein said first and second portions are cylindrical in shape and separated from each other by a frustoconical portion.

20. An assembly for the packaging and metered dispensing of a cosmetic product, comprising a container formed from a body which has one end closed by a bottom, and another end forming a neck, a free edge of which defines an opening, wherein at least a portion of said container is deformable to exert pressure on the cosmetic product, the assembly further comprising a metering end-fitting being fixedly mounted on said neck, wherein the metering end-fitting comprises:

a metering chamber having at least one outlet passage;

a piston defining a portion of the metering chamber and slidably mounted in said metering chamber so as to be able to pass, in response to pressure of the cosmetic product caused by deformation of said container, from a first position in which the metering chamber has a maximum volume to a second position in which the metering chamber has a minimum volume, said metering chamber comprising at least one inlet passage which is open when the piston is in the first position, and wherein said at least one inlet passage is closed in a substantially sealed manner when the piston has reached the second position;

a closure element which closes off in a substantially sealed manner the at least one outlet passage in the metering chamber when said piston is in said first position, and wherein said closure element frees said outlet passage during at least a portion of movement of the piston from said first position to said second position.

21. The assembly according to claim 20, wherein said closure element frees said outlet passage substantially at a time that said inlet passage closes.

22. The assembly according to claim 20, wherein said metering chamber includes a skirt, and wherein said at least one inlet passage extends through said skirt, and further wherein when said piston is in said first position and said metering chamber is not filled, deformation of said container causes said product to flow through said at least one inlet passage and into said metering chamber.

23. The assembly according to claim 22, wherein said skirt further includes at least one tab to prevent said piston from moving out of said metering chamber, and wherein said piston is adjacent to said at least one tab when said piston is in the first position.

24. A metering end-fitting to be mounted on a container containing a product, said end-fitting comprising:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston such that, in the first position of the piston, the closure element closes off in a substantially sealed manner the at least one outlet passage in the metering chamber, and such that the closure element frees said outlet passage substantially at a time that the inlet passage closes, said closure element being mounted to move with a shorter travel than the travel of the piston, and wherein the closure element is coupled to said piston such that said closure element is moved to a position for closing the outlet passage during the return of the piston to the first position;

the metering end-fitting further comprising a stop provided on the closure element, with which stop the piston is capable of coming into engagement.

25. A metering end-fitting to be mounted on a container containing a product, said end-fitting comprising:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, further comprising means for allowing air to be taken up into the container during the return of the piston to the first position, wherein the means for allowing air to be taken up into the container during the return of the piston to the first position comprises the outlet passage.

26. An assembly for the packaging and metered dispensing of a cosmetic product, comprising a container formed from a body which has one end closed by a bottom, and another end forming a neck, a free edge of which defines an opening, a metering end-fitting being fixedly mounted on said neck, wherein the metering end-fitting comprises:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, wherein the body has walls capable of deforming when pressure is exerted on them and of returning to their initial shape when said pressure is released.

27. An assembly for the packaging and metered dispensing of a cosmetic product, comprising a container formed from a body which has one end closed by a bottom, and another end forming a neck, a free edge of which defines an opening, a metering end-fitting being fixedly mounted on said neck, wherein the metering end-fitting comprises:

a metering chamber having at least one outlet passage;

a piston defining a portion of the metering chamber and slidably mounted in said metering chamber so as to be able to pass from a first position in which the metering chamber has a maximum volume to a second position in which the metering chamber has a minimum volume, said metering chamber comprising at least one inlet passage which is open when the piston is in the first position, and closed in a substantially sealed manner when the piston has reached the second position;

a closure element coupled to the piston which, in the first position of the piston, closes off in a substantially sealed manner the at least one outlet passage in the metering chamber and frees said outlet passage when the inlet passage is closed, said closure element being mounted to move with a shorter travel than the travel of the piston, wherein said container contains one of a shampoo, a conditioner, a hair gel and a beauty milk or cream.

28. An assembly for the packaging and metered dispensing of a cosmetic product, comprising a container containing the product wherein at least a portion of said container is deformable to exert pressure on the cosmetic product, and wherein said container is equipped with a metering end-fitting, wherein the metering end-fitting comprises:

a metering chamber having at least one outlet passage;

a piston defining a portion of the metering chamber and slidably mounted in said metering chamber so as to be able to move, in response to pressure of the cosmetic product caused by deformation of said container, from a first position in which the metering chamber has a maximum volume and is in fluid communication with the container to a second position in which the metering chamber has a minimum volume and is isolated from the container;

a closure element coupled to the piston which, in the first position of the piston, closes off in a substantially sealed manner the at least one outlet passage, and frees said outlet passage when the fluid communication between the container and the metering chamber is stopped, said closure element being mounted to move with a shorter travel than the travel of the piston.

29. The assembly according to claim 28, wherein said closure element moves in conjunction with the piston during a first portion of the movement of the piston towards the second position.

30. The assembly according to claim 28, wherein said metering chamber includes a skirt, and wherein said at least one inlet passage extends through said skirt, and further wherein when said piston is in said first position and said metering chamber is not filled, deformation of said container causes said product to flow through said at least one inlet passage and into said metering chamber.

31. The assembly according to claim 30, wherein said skirt further includes at least one tab to prevent said piston from moving out of said metering chamber, and wherein said piston is adjacent to said at least one tab when said piston is in the first position.

32. A metering end-fitting to be mounted on a container containing a product, said end-fitting comprising:

a) a metering chamber having at least one outlet passage;

b) a piston defining a portion of the metering chamber and slidably mounted in said metering chamber so as to be able to move from a first position in which the metering chamber has a maximum volume and in which at least one inlet passage allows for a fluid communication between the metering chamber and the container, to a second position in which the metering chamber has a minimum volume and in which the metering chamber is isolated from the container; and c) a closure element which, in the first position of the piston, closes off in a substantially sealed manner the at least one outlet passage in the metering chamber, and which frees said outlet passage when the fluid communication between the container and the metering chamber is stopped, said closure element being mounted to move with a shorter travel than a travel of the piston, the closure element being coupled to the piston so that, when the metering chamber is in fluid communication with the container, a pressure of the product exerted on the closure member causes the piston to move from the first position towards the second position.

33. An assembly for the packaging and metered dispensing of a cosmetic product, comprising a container containing the product and equipped with a metering end-fitting, said end-fitting comprising:

a) a metering chamber having at least one outlet passage;

b) a piston defining a portion of the metering chamber and slidably mounted in said metering chamber so as to be able to move from a first position in which the metering chamber has a maximum volume and is in fluid communication with the container to a second position in which the metering chamber has a minimum volume and is isolated from the container; and c) a closure element which, in the first position of the piston, closes off in a substantially sealed manner the at least one outlet passage in the metering chamber, and which frees said outlet passage when the fluid communication between the container and the metering chamber is stopped, said closure element being mounted to move with a shorter travel than a travel of the piston and, in response to a pressure of the product, driving the piston in the metering chamber substantially until the fluid communication is stopped.

\* \* \* \* \*